Patented June 7, 1938

2,119,674

UNITED STATES PATENT OFFICE 2,119,674

PRODUCTION OF GLYCOLS AND THEIR ESTERS FROM FATTY ACIDS

Adolf Grün, Basel, Switzerland, assignor to American Hyalsol Corporation, Wilmington, Del., a corporation of Delaware No Drawing. Application October 22, 1935, Serial No. 46,121. In Germany October 31, 1934

9 Claims. (Cl. 260—106)

This invention relates to glycols of high molecular weight and more particularly to the production of such glycols from saturated fatty acids having at least 8 carbon atoms in their molecules.

An object of the present invention is to produce high molecular glycols suitable primarily as raw materials for the production of wetting, cleaning, dispersing and finishing agents in the textile and other related fields.

Another object of the invention is to produce esters of such glycols with high molecular fatty acids which likewise find use in the industrial arts either as such or in the form of their derivatives.

In its broader aspects, the present invention involves dissolving or suspending higher molecular fatty acids in a sulfonation agent of the nature of sulfuric acid or fuming sulfuric acid with or without an addition of boric acid and then treating the resulting mass with a persulfate compound under conditions which remove the carboxylic groups from the fatty acids and convert the same into glycols. Without any intention of limiting its scope to the specific details given, the invention is most effectively carried out in accordance with the following example.

*Example*

100 parts of technical stearic acid are dissolved in concentrated sulphuric acid at 70° C. To the solution 20 parts of boric acid and 0.5 part of silver sulphate are added. The mass is allowed to cool only so far, that it remains liquid and an amount of oleum containing 33% SO$_3$ is added, sufficient to form with the weaker sulphuric acid already present a sulphuric acid of 100%. In the solution are introduced slowly and cautiously 200 parts of finely powdered potassium persulfate at 50° C. After introducing all the persulfate, the mixture is allowed to stand for several hours. Then it is poured on to ice water and the resulting emulsion is boiled until it is broken and separation is possible. This separation may be accelerated by addition of sodium chloride or the like. There results 90% by weight of the fatty acid treated in the form of a white wax with a neutralization number of nearly 40 and an ester number of nearly 80. When the product is separated in known manner with soda lye into saponifiable and unsaponifiable matter, approximately equal parts of the two constituents are obtained. The unsaponifiable part consists of a glycol with the hydroxyl number of 389 (calculated 409). The saponifiable part consists of one-half of unaltered stearic acid and one-half of hydroxy-stearic acids. These acids can be treated once more as above described, either as is or mixed with new quantities of stearic acid.

From the above mentioned reaction mass the glycol and other valuable products, which appear to be hydroxy carbonyl compounds, can be separated from the unreacted materials and other undesirable oxidation products by any suitable or customary method and may be employed in such form in industrial processes or after conversion by treatment with acid or other agents. Alternatively, the glycol and hydroxy carbonyl compound product may be treated with reduction agents, catalytic or otherwise, to convert the hydroxy carbonyl compounds into glycols, before use in the industrial arts.

Without altering the conditions employed in the above described example in any material or substantial way, other acids may be substituted for the stearic acid, namely, caprylic acid, capric acid, lauric acid, myristic acid, pentadecylic acid, palmitic acid, arachic acid, behenic acid, cerotic acid and melissic acid. Instead of employing single fatty acids, natural or commercially prepared mixtures of fatty acids which may either be completely saturated or contain a preponderant amount of saturated fatty acid may be used, and as a result very suitable raw materials for the production of textile and other treating agents are obtained. As examples of such mixtures there may be mentioned those derived from cocoanut oil, palm kernel oil, and also those fatty acid mixtures of hardened vegetable and animal oils and fats, and the like.

Instead of using concentrated sulfuric acid of 66° Bé. or stronger acid in the foregoing example, there may be substituted therefor fuming sulfuric acid, with about equally good results. Furthermore, the oxidizing reaction in many cases is assisted by the addition of a quantity of boric acid to the sulfuric acid. The amount of boric acid may be from 1% to 20% of the amount of fatty acid employed.

It should be understood that the present invention is not limited to the specific compounds and conditions herein specifically described, for variations of the same will occur to those skilled in the art. The scope of the invention is to be determined by the general tenor of the specification and the subject matter of the appended claims.

For example, instead of causing the oxidation by the use of sodium persulfate, other like compounds may be employed, for example potassium persulfate, ammonium persulfate, calcium persulfate, barium persulfate and similar persulfates. Peroxides may also be used if the temperatures are properly regulated.

During the addition of the persulfate, the reaction mass preferably should be maintained at temperatures within the range of 35° C. to 75° C. Instead of regulating the temperature by the rate of sulfate addition, other means may be employed, as through the use of jacketed tanks or coils.

The high molecular glycols obtained by the process of the present invention constitute valuable treatment agents for use in the textile field in the form of their sulfonate salts, their sulfuric acid ester salts and their phosphate salts. Furthermore, the glycols may be etherified with glycerine or other low molecular alcohols and sulfated or sulfonated to produce textile treating agents.

The higher molecular glycol esters of the fatty acids obtainable by the present process are wax-like in character and are suitable for use in place of waxes in shoe creams, polishing creams, and the like.

Although the primary products produced by the process of the present invention are stated herein to be glycols, it should be understood that it is possible that other neutral oxygen-containing derivatives of hydrocarbons may be obtained.

I claim:

1. The process of preparing neutral oxygen-containing derivatives of hydrocarbons of high molecular weight which comprises oxidizing a saturated fatty acid having at least 8 carbon atoms by subjecting such acid while admixed with a sulfonation agent selected from the group consisting of sulfuric acid and fuming sulfuric acid to the action of a persulfate.

2. The process which comprises mixing a saturated fatty acid having at least 8 carbon atoms with sulfuric acid and a persulfate, thereby converting said fatty acid into a neutral oxygen-containing derivative of a hydrocarbon.

3. The process which comprises adding a persulfate to a mixture of a saturated fatty acid having at least 8 carbon atoms with sulfuric acid at a rate to form a product composed predominantly of neutral oxygen-containing derivatives of hydrocarbons of high molecular weight.

4. The process which comprises mixing a saturated fatty acid having at least 8 carbon atoms with sulfuric acid, boric acid and a persulfate thereby converting said fatty acid into a neutral oxygen-containing derivative of a hydrocarbon of high molecular weight.

5. The process which comprises adding a persulfate to a mixture of a saturated fatty acid having at least 8 carbon atoms with sulfuric acid and boric acid at a rate to form a product composed predominantly of glycols of high molecular weight.

6. The method which comprises mixing a saturated fatty acid having at least 8 carbon atoms with sulfuric acid and a persulfate at a moderately elevated temperature whereby glycols and esters of the glycols with part of the acid employed are formed.

7. The method of producing high molecular aliphatic acid esters of high molecular glycols which comprises mixing a saturated fatty acid having at least 8 carbon atoms with sulfuric acid and a persulfate at a moderately elevated temperature and after the reaction has gone to completion heating the mass, thereby producing the said esters.

8. The process of preparing neutral oxygen-containing derivatives of hydrocarbons of high molecular weight which comprises adding a persulfate to a mixture of a saturated fatty acid having at least 8 carbon atoms with sulfuric acid at a slow rate which maintains the temperature not substantially above room temperature, and separating the oxidized products from the unoxidized fatty acid.

9. The process which comprises substantially dissolving stearic acid in a sulfonation agent selected from the group consisting of sulfuric acid and fuming sulfuric acid and adding a persulfate slowly thereto at a rate which maintains the mass at a moderately elevated temperature whereby a product composed predominantly of neutral oxygen-containing derivatives of hydrocarbons of high molecular weight are produced.

ADOLF GRÜN.